United States Patent
Jung et al.

(10) Patent No.: US 10,052,944 B2
(45) Date of Patent: Aug. 21, 2018

(54) UNIT BEARING HAVING A CARRYING ELEMENT AND PRODUCTION METHOD

(71) Applicant: BOGE Elastmetall GmbH, Damme (DE)

(72) Inventors: Sven Jung, Rosrath (DE); Frank Nelles, Steimel (DE)

(73) Assignee: BOGE Elastmetall GmbH, Damme (DE)

( * ) Notice: Subject to any disclaimer, the term of this patent is extended or adjusted under 35 U.S.C. 154(b) by 0 days.

(21) Appl. No.: 15/312,213

(22) PCT Filed: May 18, 2015

(86) PCT No.: PCT/EP2015/060852
§ 371 (c)(1),
(2) Date: Nov. 18, 2016

(87) PCT Pub. No.: WO2015/177074
PCT Pub. Date: Nov. 26, 2015

(65) Prior Publication Data
US 2017/0087974 A1    Mar. 30, 2017

(30) Foreign Application Priority Data
May 19, 2014 (DE) .................. 10 2014 209 424

(51) Int. Cl.
*F16M 1/00* (2006.01)
*B60K 5/12* (2006.01)
(Continued)

(52) U.S. Cl.
CPC ............ *B60K 5/1291* (2013.01); *B29C 65/02* (2013.01); *B29C 65/48* (2013.01); *B29D 12/00* (2013.01);
(Continued)

(58) Field of Classification Search
CPC .... B60G 11/22; B60K 5/1208; B60K 5/1291; F16F 1/3842; F16F 1/3732
(Continued)

(56) References Cited

U.S. PATENT DOCUMENTS 5,470,049 A * 11/1995 Wohler .................. B60G 11/16
267/170
5,540,420 A * 7/1996 Luzsicza ............... F16C 27/063
267/141.1
(Continued)

FOREIGN PATENT DOCUMENTS

DE            10127657 A1 * 12/2002 ............ F16F 1/3732
DE     102006050070 A1 *  5/2008 ........... B60K 5/1208

*Primary Examiner* — Christopher P Schwartz
(74) *Attorney, Agent, or Firm* — Dinsmore & Shohl LLP

(57) ABSTRACT

A unit bearing includes a bearing body configured to be received by a rigid bearing housing provided with an opening on at least one side, a carrier element and at least one support member engaging the rigid bearing housing through the opening. The bearing body includes elastomer abutments. The elastomer abutments are disposed between the rigid bearing housing and the support member. The carrier element is disposed between the support member and the elastomer abutments. The unit bearing is configured such that relative movements of the bearing body with respect to the bearing housing caused by loading of the support member along three mutually orthogonal directions are limited by the elastomer abutments.

16 Claims, 3 Drawing Sheets

(51) Int. Cl.
*F16F 1/371* (2006.01)
*B29C 65/48* (2006.01)
*B29C 65/02* (2006.01)
*B29D 12/00* (2006.01)
*B29K 621/00* (2006.01)

(52) U.S. Cl.
CPC ........ *F16F 1/371* (2013.01); *B29K 2621/003* (2013.01); *F16F 2230/32* (2013.01)

(58) Field of Classification Search
USPC ............ 267/140.2–140.4, 141.1–141.7, 153; 248/633, 634, 636, 638; 52/167.1–167.7
See application file for complete search history.

(56) References Cited

U.S. PATENT DOCUMENTS

| | | | | |
|---|---|---|---|---|
| 5,833,205 | A * | 11/1998 | Lindbeck | B65D 88/66 221/200 |
| 5,890,704 | A * | 4/1999 | Tsutsumida | F16F 13/14 267/140.12 |
| 7,997,041 | B2 * | 8/2011 | Slack | B01D 24/24 210/289 |
| 8,069,630 | B2 * | 12/2011 | Slack | B01D 24/24 210/289 |

* cited by examiner

UNIT BEARING HAVING A CARRYING ELEMENT AND PRODUCTION METHOD

FIELD OF THE INVENTION

The invention relates to a unit bearing having an elastomer bearing body which is received in a rigid bearing housing provided with an opening at at least one side, wherein at least one support member engages through the at least one opening and is supported against the bearing housing at the bearing body, and wherein relative movements of the bearing body with respect to the bearing housing caused by loading of the support member along three mutually orthogonal directions of extent of the bearing body at both sides of a position of rest of the respective relative movement can be limited by elastomer abutments arranged between the bearing housing and the support member. In addition, the invention relates to a method of manufacturing such a unit bearing.

BACKGROUND OF THE INVENTION

Such unit bearing arrangements are known and serve the limitation of movements which are caused by the engine and which are transmitted via a support member to the bearing body of the arrangement, said bearing body optionally being configured in multiple parts, and the forces which occur are led off at the pivot points of the support member at the vehicle body. They are in particular especially used in automotive engineering in large volumes for the support of the transmission. Simple embodiments of such bearings substantially comprise an elastomer bearing body and a rigid bearing housing which surrounds and receives the bearing body. In this respect, on a use of the bearings in accordance with their intended purpose, the respective bearing bodies carry out movements relative to the bearing housing on operation of a vehicle equipped with them due to the loads which occur within the bearing housing. These relative movements of the bearing body have to be limited in this regard with respect to the respective enabled path in the different directions so that the bearings are equipped with abutments which are formed by the bearing housing on the basis of a corresponding shaping of the housing or which are formed, however, at least at the bearing housing by means of corresponding additional elements. The abutments can in this respect also form parts of a multi-part bearing body.

Abutments for the relative movements of the bearing body are required in the three main directions of load for the use in automotive engineering. These abutments limit the movement of the bearing body in the X direction, that is in the longitudinal direction of the vehicle or with respect to the direction of travel; in the Y direction, that is transversely to the longitudinal direction of the vehicle or with respect to the direction of travel; and in the Z direction, that is with respect to the vertical extent of the vehicle, in each case both with respect to the respective positive component and with respect to the corresponding negative component of the corresponding direction vector.

In this respect, the support members are pre-treated in total with the known unit bearings, with the pre-treatment comprising a degreasing washing and a roughening of the surface to increase the surface by a blasting process, for example by corundum blasting. The support members known from the prior art are subsequently coated at a region provided for this purpose by vulcanization with an elastomer material and are subsequently installed. The surface connected to the elastomer material by vulcanization in this process ultimately, however, only amounts to approximately 50% of the total surface. During the pre-treatment, parts of the respective support member have in this respect to be covered such that the surfaces not to be rubberized are free from adhesive.

The solid support members, frequently comprising an aluminum die casting, furthermore have to be preheated prior to the vulcanization, with work alternatively also being carried out with delayed injection in order subsequently to achieve a uniform wetting with the elastomer applied. The dimensions of the support members in this respect bring about a reduction of the number of possible cavities within the vulcanization tool.

It is therefore the object of the present invention to provide an elastomer bearing which reduces or even totally avoids the aforesaid disadvantages and can thus be manufactured faster and more favorably.

This object is achieved by a unit bearing of the initially named kind in which at least one common carrier element is arranged between the support member and the elastomer abutments of the bearing body and simultaneously spaces the support member from all elastomer abutments. The support member is therefore actually separated from the abutments by the at least one carrier element and the vulcanization can only take place at the at least one carrier element so that, conversely, the support member can be excluded from the vulcanization. This circumstance makes it possible to connect the elastomer abutments first permanently to the at least one carrier element and only then to connect the created assembly releasably to a section of the support member. The elastomer to be vulcanized to the support member can, for instance, first be applied to a carrier element in the form of a plastic carrier plate which is admittedly subsequently fixed to the support member, but is nevertheless releasably connected to it.

The initially described pre-treatment (washing and blasting) is now dispensed with by the described separation of the abutments from the support member and their application to a carrier element especially provided for this purpose. It furthermore has a time-saving effect that a preheating of the support member or a delayed injection can be dispensed with. In addition, an increased yield of support members provided with abutments can be achieved since a higher number of cavities, for example twice the number, is available in the vulcanization tool. In addition, a cost saving can also be based on the fact that a defective vulcanization, which can indeed occur, does not immediately have the result that the support member becomes a reject. The releasable connection between the carrier element and the carrier plate furthermore has a positive effect in the development process, and here in particular in the coordination phase, since carrier elements having a different elastomer material, which varies in Shore hardness, for example, can be replaced in a simple manner.

Further advantageous embodiments of the unit bearing result from the dependent claims.

A durable connection between the carrier element and the support member is achieved in an advantageous embodiment in that the carrier element forms at least one shape fit with at least one region of the support member in the position of use and on its interlocking by one or more regions of the carrier element with those of the support member, the release movement of the two connection partners is blocked in at least one direction.

In this respect, in an advantageous embodiment, the carrier element can be provided with one projection or with a plurality of projections which engages/engage in cut-outs located at the support member and/or vice versa. The converse means the formation of the projection or projections at the support member.

Expediently, in further developments of the unit bearing, the projections have a geometrical shape in cross-section which can be simply implemented, which provides the required surfaces for forming the shape fit and which does not make any undercuts necessary at a shaping tool for producing carrier elements. Equally, the undercuts can also be dispensed with in the tools for manufacturing support members which consist of an aluminum die casting, for example. Such geometrical shapes can be cruciform or triangular in cross-section, for example.

In a preferred further development, the projections can vary their cross-sections over their extents and can in particular taper in the projecting direction, so that they, for example, extend conically in the direction of the associated tool chamfer of the manufacturing tool, which facilitates the subsequent mold removal. A triangular cross-section of the projections which tapers in the projecting direction can thus engage into corresponding cut-outs. A kind of honeycomb structure, in which the multiple, planar contact of the surfaces of the carrier element at those of the support member ensures a better force distribution, can be formed with a plurality of such projections which form a quadrangle, for instance, in cross-section adjacent to one another. This honeycomb structure or also another suitable structure can also form a kind of thread-in aid in the arrangement of the carrier element at the support member.

In another embodiment of the unit bearing advantageously counteracting the release movement of the carrier element from the support member, the carrier element can contact at least two oppositely disposed side surfaces of the support member in a planar manner in the position of use and can be preloaded toward them. The side surfaces can hereby, on the one hand, counteract a movement in parallel with their perpendicular; however, due to the preload of the contact surfaces of the carrier element, a force fit can also be formed which inhibits a movement in parallel with the side surface of the support member.

An embodiment of the unit bearing can comprise at least one section of the support member having a substantially quadrangular contour and the carrier element engaging over this section at three sides and at corner regions which bound an uncovered side such that, with a carrier element arranged at the support member, a kind of transport securing device is also formed for the former by the engaging over in the corner regions, said transport securing device holding the carrier element captive at the support member by the abutments.

The support member can generally be provided over its longitudinal extent and over its cross-sectional extent with a cross-section variation which can respectively represents surfaces for forming a shape fit.

In another embodiment of the unit bearing, the carrier element has a contour which corresponds to the covered section of the support member or which differs therefrom such that a higher coordination flexibility and variant flexibility can be produced by a replacement of the respective carrier element which can in turn also have an effect on the contours of the elastomer abutments which can in turn then be designed more flexibly. Depending on the design of the support member, the possibility may also result of replacing a part of its body volume with the carrier element so that then a weight reduction also advantageously accompanies an arrangement of the carrier element in the position of use.

In a further development of the unit bearing, the elastomer abutments expediently form a common abutment body which completely encompasses the carrier element in which it is connected to the support member in the position of use. In this respect, the respective margins of abutment bodies and carrier element can terminate flush at the support member. The abutment body itself can in this respect be considered a part of the bearing body at which the support body is supported against the bearing housing.

In another embodiment of the unit bearing, the carrier element can be formed from a thermoplastic. This embodiment is advantageous, in particular with regard to a grease-free production of the carrier element and to a direct application of adhesive. The carrier element can be manufactured simply and inexpensively in this manner by means of corresponding tools in an injection molding process. The respective plastic can preferably be formed from a polyamide which forms a construction material very suitable for the carrier element due to its properties of high strength and toughness and due to its chemical resistance. Other materials such as polysulfides, polysulfones, polyimides or polyketones are also conceivable, however.

The problem mentioned above is also solved by a method of manufacturing a unit bearing, in particular a unit bearing as has already been described above, that is having an elastomer bearing body which is received in a rigid bearing housing provided with an opening at at least one side, wherein at least one support member engages through the at least one opening and is supported against the bearing housing at the bearing body, and wherein relative movements of the bearing body with respect to the bearing housing caused by loading of the support member along three mutually orthogonal directions of extent of the bearing body at both sides of a position of rest of the respective relative movement can be limited by elastomer abutments arranged between the bearing housing and the support member. The respective method is characterized in that the elastomer abutments are first permanently connected to a carrier element and the created assembly is subsequently releasably connected to a section of the support member. The support function of the support member for the unit is hereby decoupled from the carrier function for the elastomer abutments of one or more abutment bodies which can optionally also be associated with the bearing body of the unit bearing.

In an advantageous variant of the method, an abutment body formed from the elastomer abutments can be attached directly to the carrier element while applying an adhesive in order subsequently to be vulcanized. The vulcanization of the abutment body therefore takes place without the support member. It is also conceivable to vulcanize a plurality of abutments or abutment bodies to the carrier element in the same process.

DETAILED DESCRIPTION OF THE DRAWINGS

Figure 1:
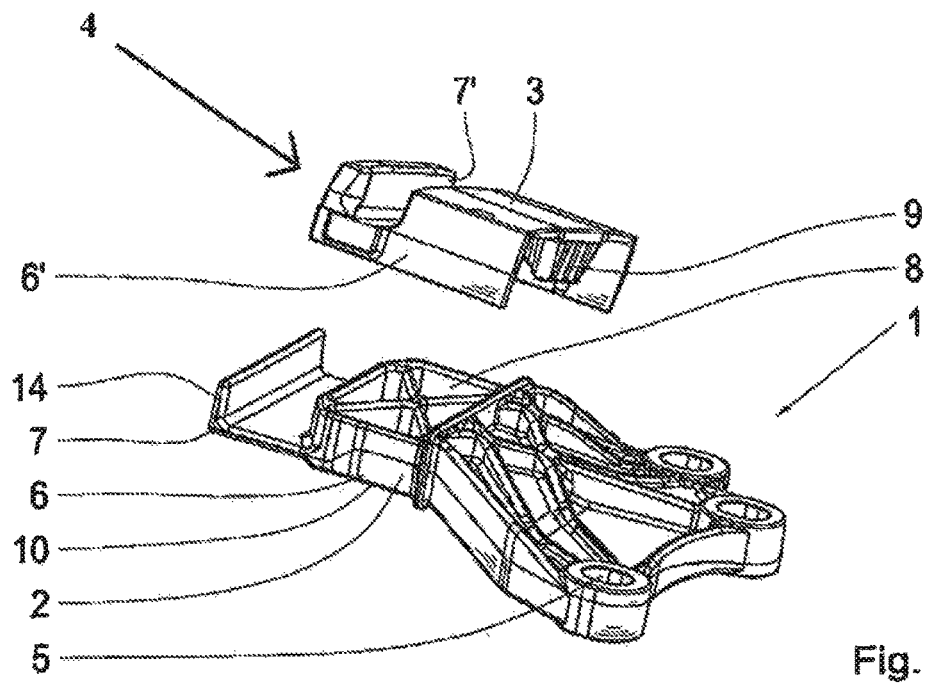
FIG. 1 a perspective side view of a first embodiment with a support member and with a carrier element located thereabove.
Figure 2:
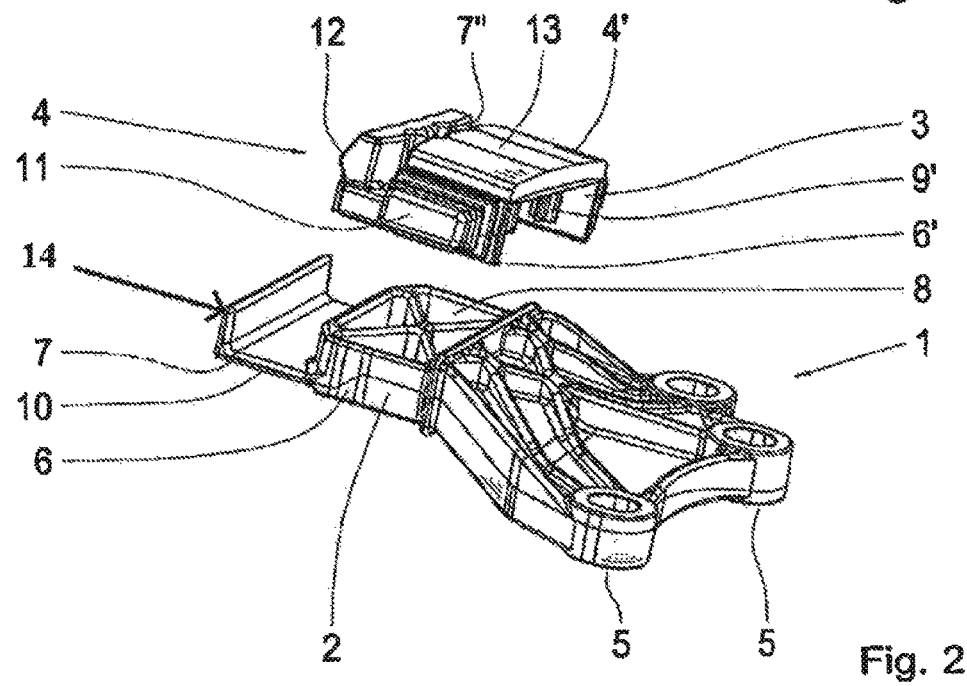
FIG. 2 a perspective side view of a second embodiment with a support member and with a carrier element located thereabove at which an abutment body with abutments is arranged.
Figure 3:
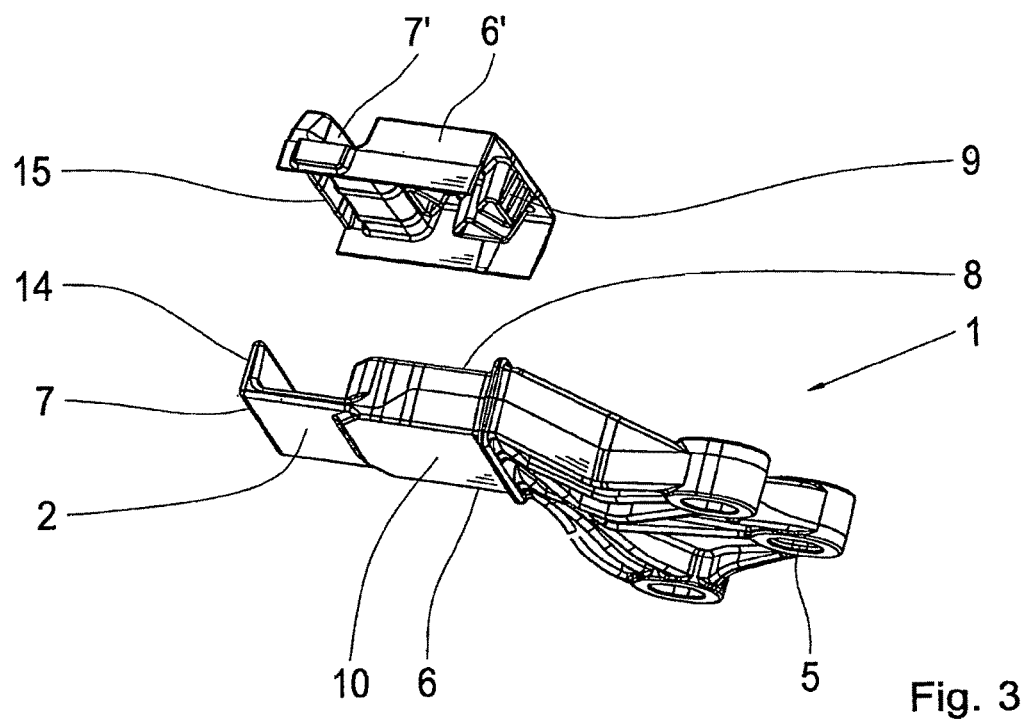
FIG. 3 a perspective view obliquely from below of an embodiment having a support member above which a carrier element is arranged at which projections and cut-outs can be recognized for interlocking with complementary regions of the support member.

The components of a support member 2 associated with a unit bearing not shown in any greater detail precision and marked as a while by 1 and a carrier element 3 which is formed from a thermoplastic and which can be releasably connected to the support member 2 can be recognized in FIGS. 1 to 3. An abutment body 4' can only be seen in FIG. 2 in this respect; it is vulcanized onto the carrier element 3 and recognizably completely covers it for the viewer at least to the front side, rear side and upper side and simultaneously forms a bearing body 4, not shown in further detail, at which the support surface 10 located at the lower side of the support member 2 for the viewer in FIGS. 1 to 3 is supported. A common carrier element 3 which simultaneously spaces the support member 2 from all the elastomer abutments 11, 12, 13 in the X, Y and Z directions is therefore arranged between the support member 2 and the elastomer abutments 11, 12, 13 of the bearing body 4 which form the abutment body 4'. In this respect, at least one abutment can be recognized in FIG. 2 in at least one deflection direction from a position of rest with respect to the respective direction of movement, with the abutment 12 bounding the deflection in both direction of deflection of this direction of movement in the Y direction by engagement of a section, not further shown, of the bearing housing, likewise not to be recognized. It can furthermore be recognized in FIG. 2 that the elastomer abutments 11, 12, 13 form a common abutment body 4' which completely outwardly encompasses the carrier element 3 in the position of use.

When looking at the support member 2 in the three representations of FIGS. 1 to 3, three eyelets 5 approximately at the end face can be recognized in the section of said support member at the right for the viewer for the at least indirect connection of the support member 2 to a section of a unit not further shown, in particular of an internal combustion engine or of a drive unit comprising an internal combustion engine and a transmission. Turning to the left in the view, the cross-section of the support member 2 tapers and merges into a parallelepiped section 6 at whose left end face a section 7 of a U section type, viewed from the side, bounds the support member 2. The parallelepiped section 6 in this respect has four triangular cut-outs 8 which are grouped in a kind of honeycomb structure to form a quadrangle and which are arranged at the upper side of the section 6 for the viewer. These cut-outs 8 form engagements for the complementary projections 9, 9' which are formed at the carrier element 3 and which engage into the cut-outs 8 in the position of use and whose walls form a shape fit with the cut-out walls oppositely adjacent them. The projections 9 in accordance with FIGS. 1 and 3 are formed in the manner of a truncated pyramid. The carrier element 3 in accordance with FIG. 2 has projections 9' which are formed differently from them, namely provided with a cruciform cross-section and grouped in a regular 2×2 formation and which make corresponding cut-outs necessary at a support member 2, not shown. It can moreover be recognized, on the one hand, that the contour of the carrier element 3 in FIGS. 1 to 3 largely follows the definition by the support member 2 or by its covered sections 6, 7, which also includes a tongue-shaped, upwardly projecting projection 14 engaging into a complementary cut-out 15 of the carrier element 3 at the left end face of the support member 2. This projection 14 also has a geometrical shape, namely that of a trapezoid, which tapers per se, and indeed here actually in turn in the direction of the projection.

It finally also results from FIGS. 1 to 3 that a section 6 of the support member 2 has a substantially quadrangular contour and the carrier element 3 engages over this section 6 at three sides and at corner regions which bound an uncovered side, with the uncovered side having the support surface 10. The projections 9, 9' of the carrier element 3 engage into the cut-outs 8 disposed opposite the uncovered side at the support member 2. In this respect, the carrier element 3 contacts at least two oppositely disposed side surfaces of the support member 2 in a planar manner in the position of use and is preloaded against them such that a force fit is formed at the side surfaces of the parallelepiped section 6.

Figure 4:
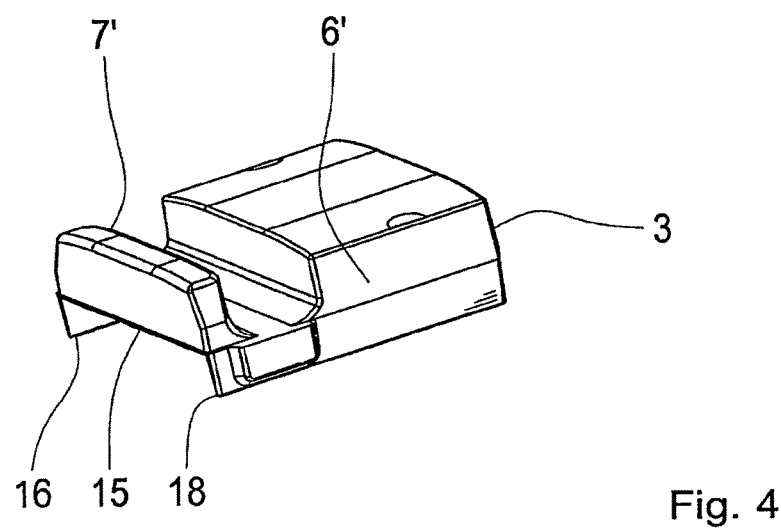
FIG. 4 a perspective view obliquely from above of a carrier element from FIGS. 1 to 3.
Figure 5:
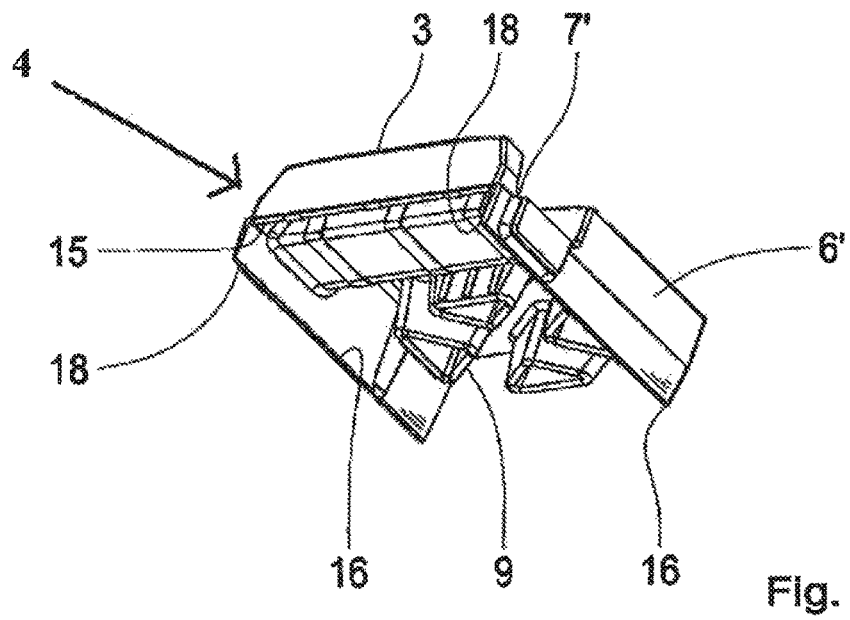
FIG. 5 a perspective side view of the lower side of a carrier element from FIG. 1 or FIG. 3.

The conditions described with respect to the carrier element 3 can again be recognized in FIGS. 4 and 5, namely substantially the two sections 6', 7' encompassing the support member 2 and the engagement 15 for the projection 14 which is arranged at the end face at the support member 2 and which projects upward approximately transversely to the longitudinal extent of the support member 2 for the viewer. It can be more exactly recognized in FIGS. 4 and 5 that latch noses 18 which engage over the corner regions of the support member 2 at its uncovered side face on another at the two lower ends of the side cheeks 16 of the carrier element 3 over their length.

Figure 6:
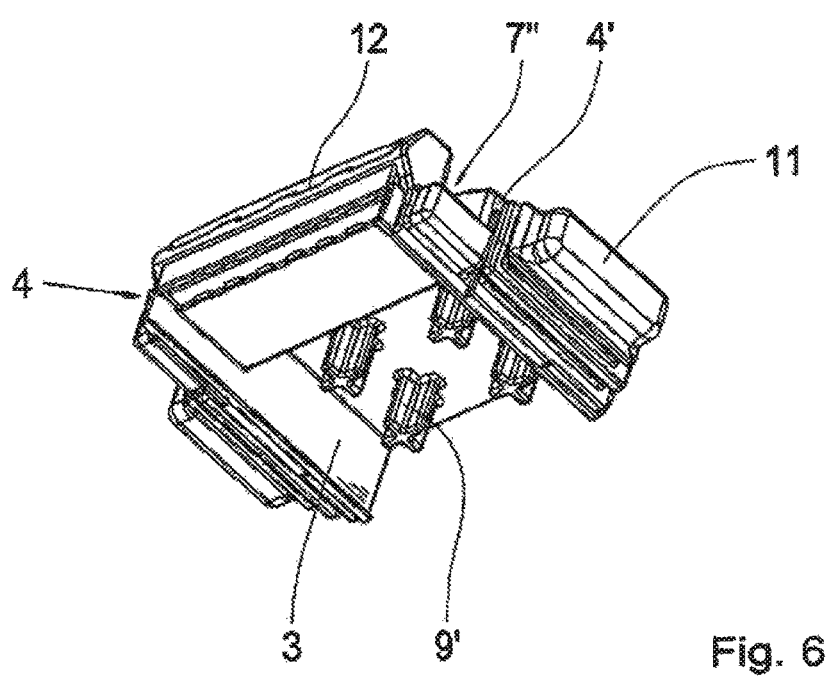
FIG. 6 a perspective side view of the lower side of a carrier element of FIG. 2.

As can easily be recognized in FIG. 6, they are connected to the carrier element 3 in one piece by projections 9' formed with a cruciform cross-section. This likewise applies to the projections 9 in accordance with FIGS. 1 and 3 formed in the manner of truncated pyramids.

The above-described invention accordingly relates to a unit bearing 1 having an elastomer bearing body 4 which is received in a rigid bearing housing provided with an opening at at least one side, wherein at least one support member 2 engages through the at least one opening and is supported against the bearing housing at the bearing body 4, and wherein relative movements of the bearing body 4 with respect to the bearing housing caused by loading of the support member 2 along three mutually orthogonal directions of extent X, Y, Z of the bearing body 4 at both sides of a position of rest of the respective relative movement can be limited by elastomer abutments 11, 12, 13 of the bearing body 4 arranged between the bearing housing and the support member 2. To have an elastomer bearing available which reduces or avoids known disadvantages and which can be manufactured faster and more favorably, a common carrier element 3 is arranged between the support member 2 and the elastomer abutments 11, 12, 13 and simultaneously spaces the support member 2 from all the elastomer abutments 11, 12, 13.

The invention claimed is:
1. A unit bearing, comprising:
a carrier element;
a bearing body configured to be received by a rigid bearing housing provided with an opening on at least one side, the bearing body including elastomer abutments;

at least one support member engaging the rigid bearing housing through the opening;

wherein the elastomer abutments are disposed between the rigid bearing housing and the at least one support member;

wherein the carrier element is disposed between the support member and the elastomer abutments; and wherein the unit bearing is configured such that relative movements of the bearing body with respect to the bearing housing caused by loading of the support member along three mutually orthogonal directions are limited by the elastomer abutments.

2. A unit bearing in accordance with claim 1, wherein the support member has at least one cutout defined therein and the carrier element is provided with at least one projection engaging in a respective cut-out of the support member, and/or the carrier element has at least one cutout defined therein and the support member is provided with at least one projection engaging in a respective cutout of the carrier element.

3. A unit bearing in accordance with claim 2, wherein at least one projection has a geometrical shape in cross-section.

4. A unit bearing in accordance with claim 2, wherein each projection tapers in the projecting direction.

5. A unit bearing in accordance with claim 1, wherein at least one section of the support member has a substantially quadrangular contour and the carrier element engages over the at least one section at three sides and at corner regions which bound a side of the support member free of the carrier element, the at least one section of the support member covered by the carrier element.

6. A unit bearing in accordance with claim 5, wherein the carrier element has a contour corresponding to the covered section of the support member or deviating therefrom.

7. A unit bearing in accordance with claim 1, wherein the carrier element spaces the support member from all of the elastomer abutments.

8. A unit bearing in accordance with claim 1, wherein the carrier element forms at least one shape fit with at least one region of the support member in the position of use.

9. A unit bearing in accordance with claim 1, wherein the carrier element contacts at least two oppositely disposed side surfaces of the support member in a planar manner in the position of use and is preloaded against them.

10. A unit bearing in accordance with claim 1, wherein the elastomer abutments form a common abutment body which completely outwardly encompasses the carrier element in the position of use.

11. A unit bearing in accordance with claim 1, wherein the elastomer abutments are disposed in three mutually orthogonal directions.

12. A unit bearing in accordance with claim 1, wherein the bearing body is an elastomer bearing body.

13. A unit bearing in accordance with claim 1, wherein the relative movements along three mutually orthogonal directions at both sides of a position of rest of the respective movement are limited by the elastomer abutments.

14. A unit bearing in accordance with claim 1, wherein the carrier element is thermoplastic.

15. A unit bearing, comprising:
a carrier element;
a bearing body configured to be received by a rigid bearing housing provided with an opening on at least one side, the bearing body including elastomer abutments;
at least one support member engaging the rigid bearing housing through the opening;
wherein the elastomer abutments are disposed between the rigid bearing housing and the at least one support member, the elastomer abutments being permanently connected to the carrier element to form an assembly;
wherein the carrier element is disposed between the support member and the elastomer abutments; and
wherein the unit bearing is configured such that relative movements of the bearing body with respect to the bearing housing caused by loading of the support member along three mutually orthogonal directions are limited by the elastomer abutments, the assembly being releasably connected to at least one section of the support member.

16. A unit bearing in accordance with claim 15, wherein the elastomer abutments are directly applied onto the carrier element by applying a bonding agent so as to form an abutment body, the abutment body being subsequently vulcanized.

* * * * *